Patented Dec. 15, 1936

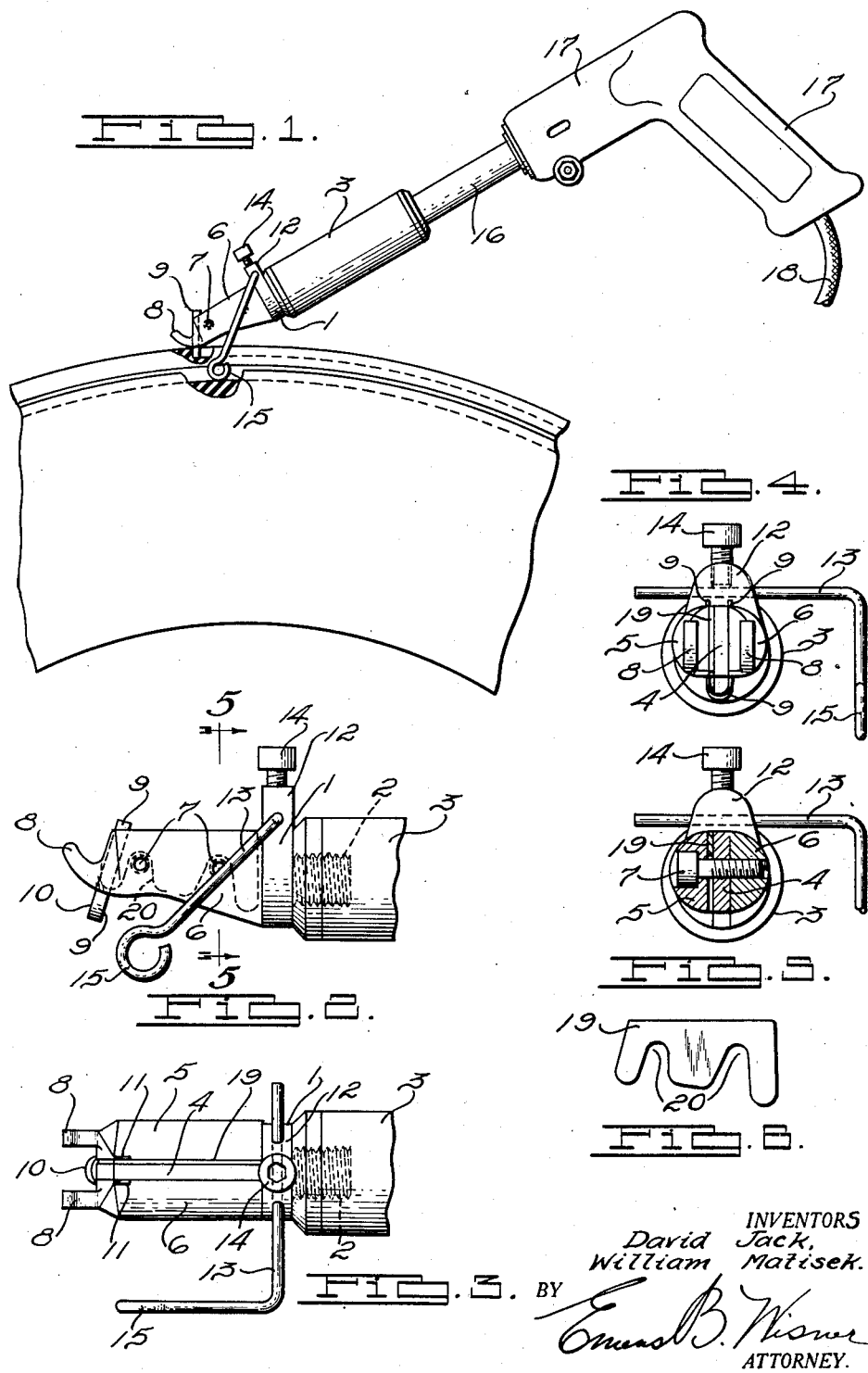

2,063,894

UNITED STATES PATENT OFFICE 2,063,894

TIRE GROOVER

David Jack and William Matisek, Detroit, Mich., assignors of one-fourth to said Matisek, one-half to Allied Manufacturers, Inc., Detroit, Mich., a corporation of Michigan, and one-fourth to E. Elmer Staub, Grosse Pointe Park, Mich.

Application June 7, 1934, Serial No. 729,450

6 Claims. (Cl. 30—20)

This invention relates to tire groovers and the object of the invention is to provide a device for cutting grooves in a tire tread and particularly adapted for re-grooving worn treads or cutting new grooves in a newly vulcanized portion of a tire.

Another object of the invention is to provide a tire groover in which the cutting head is electrically heated and in which the grooving blade is adjustable for width and depth of cut.

A further object of the invention is to provide a tire groover in which shims may be provided for varying the width of the cutting blade and in which the cutting blade is also longitudinally adjustable for depth of cut.

Another object of the invention is to provide a guide for use on either side of the grooving head for guiding the cutter blade.

These objects and the several novel features of the invention are hereinafter more fully described and claimed and the preferred form of construction by which these objects are attained is shown in the accompanying drawing in which—

Fig. 1 is a view of the entire grooving tool as used on a tire tread.

Fig. 2 is an enlarged side elevation of the tire grooving head.

Fig. 3 is a top plan view of the tire grooving head.

Fig. 4 is a front end view of the device.

Fig. 5 is a section taken on line 5—5 of Fig. 2.

Fig. 6 is a view of one of the shims for adjusting the width of the blade.

The invention resides more particularly in the grooving head and this comprises a portion 1 having a threaded end 2, as shown in dotted lines in Fig. 2, which may be threaded into the electrically heated member 3. The member 1 is provided with an integral extending rib 4, shown more particularly in Figs. 3 and 5. A member 5 is positioned on one side of the rib 4 while a member 6 is positioned on the opposite side thereof and these two members are secured together on the rib 4 by means of the machine screws 7, shown in Figs. 2 and 5. In this connection it will be noted that the member 5 is recessed to receive the heads of the machine screws 7 so that no projecting parts are exposed. The members 5 and 6 are each provided at the extreme end with an upwardly curved lug 8 and these lugs are curved so as to ride on the surface of the tire, as will be understood from Fig. 1. The blade 9 is substantially U-shaped in form and is provided with a sharpened entering edge 10 and the members 5 and 6 are provided with grooves 11 to receive the upper end portions of the blade 9, as will be understood from Figs. 2 and 3. The portion 1 is provided with an upwardly extending end 12 which is provided with a transverse aperture in which the guide bar 13 may be positioned. This guide bar may be adjustably secured in the portion 12 by means of the set screw 14 and the end 15 of the guide bar 13 is circular in form so as to ride on the adjacent portion of the tire when the groove is being cut. The cylindrical body 3 into which the end 2 of the member 1 is threaded contains a heating element (not here shown) by which this body is heated and the heat is transferred through the member 1 to the blade 9 which also becomes hot.

The cylindrical body 3 is supported on a tube 16 which is secured in a handle 17 and the wires from the heating element are carried through the tube 16 and handle 17 and extend from the handle 17 at 18 so that the device may be connected in a circuit. The device is excellently adapted for use in cutting new grooves through a vulcanized part of a tire or in grooving a worn tire.

In operation, the user grasps the handle 17 in the hand and adjusts the guide bar 13 on either side of the device for marking. The curved surfaces of the lugs 8 are positioned on the surface of the tire and the device is moved forward with the hand thus pushing the sharp edge 10 of the blade 9 through the rubber and as this blade is hot it readily cuts a groove in the rubber. Due to the shape of the blade, the strip of rubber cut in making the groove remains in the groove so that subsequent cross cuts insure sharp, even edges. The blade may be adjusted vertically in the holder to allow for variation in depth of cut and the blade remains at a constant heat and the heating element is so chosen that the blade 9 never gets red hot. The blades are made of properly tempered special high-grade steel and the head consisting of the parts 1, 4, 5 and 6 are made of a heat retaining alloy. If the old tread marks appear on the tire, it is not necessary to use the guide bar 13 but if the tire surface is smooth, the guide bar may be used for quickly laying out the required lines to be followed.

If the original grooves remain in the side of the tire tread, the guide bar 13 can be adjusted so that the end 15 extends into the side groove and the blade 9 will then cut a tread groove in parallel spaced relation with the side groove. The end 15 may therefore be used both as a guide in cutting grooves parallel to other grooves in the tire and also as a marker in laying out the pattern to be cut and may be adjustably secured on either side of the grooving head for this purpose.

In order to allow for variation in the width of the blade, shims 19 may be provided as shown in Fig. 6 and these shims 19 may be positioned on opposite sides of the central rib 4 or on one side thereof, as shown in Figs. 2, 3, and 5. These shims 19 are provided with notches 20 to allow clearance for the machine screws 7 and the upper ends of the blade 9 extend on opposite sides of the shim or shims. In fact, a series of four shims are provided with the device and a series of blades of different widths are also provided. While we have shown one shim in Figs. 2, 3, and 5, shims of different thickness may be positioned on both sides of the rib 4 to provide for variation in blade width. As will be understood from Fig. 3 the cutting edge of the blade is visible between the lugs 8 in operation so that the device may be guided with the eye.

From the foregoing description it becomes evident that the device is very simple and efficient in operation, will not easily get out of order, is composed of few parts and is of consequent low manufacturing cost and provides a device which accomplishes the objects described.

Having thus fully described our invention, its utility and mode of operation, what we claim and desire to secure by Letters Patent of the United States is—

1. In a tire groover, an electrically heated member, a handle connected thereto, a grooving head threaded into the electrically heated member and provided with an extending rib, a U-shaped blade positioned with the ends thereof extending on opposite sides of said rib, a member secured to each side of said rib, each member being provided with a groove to receive the adjacent portion of the blade and each member being provided with an upwardly curved lug at the end, the lugs extending on opposite sides of the blade and a guide bar adjustably secured in said grooving head.

2. In a tire groover, an electrically heated member, a handle connected thereto, a grooving head threaded into the electrically heated member and provided with an extending rib, a U-shaped blade positioned with the ends thereof extending on opposite sides of said rib, a member secured to each side of said rib, each member being provided with a groove to receive the adjacent portion of the blade and each member being provided with an upwardly curved lug at the end, the lugs extending on opposite sides of the blade.

3. In a tire groover, a grooving head having an extending rib, a substantially U-shaped blade positioned with the upper ends thereof extending on opposite sides of the rib and a pair of members secured to opposite sides of the rib and engaging the ends of the blade between said members and the rib, each of said members being provided with an upturned lug at the end.

4. In a tire groover, an electrically heated member, a handle connected thereto, a grooving head threaded into the electrically heated member, a U-shaped blade adjustably mounted in the grooving head, a pair of curved lugs on the grooving head on opposite sides of the U-shaped blade and a guide bar adjustably mounted in the grooving head.

5. In a tire groover, an electrically heated member, a handle connected thereto, a grooving head threaded into the electrically heated member, a U-shaped blade adjustably mounted in the grooving head and a pair of curved lugs on the grooving head on opposite sides of the U-shaped blade.

6. In a tire groover, an electrically heated member, a handle connected thereto, a grooving head secured to the electrically heated member and having an extending rib, a pair of shims shaped to fit on opposite sides of said rib, a U-shaped spring steel blade adjustable in width to fit over the rib or over the rib and shims, a pair of members positioned on opposite sides of said rib and shims and adjustable securing means connecting said members and arranged for placing a pressure on the U-shaped blade and shims, the U-shaped blade being adjustable vertically between said members.

DAVID JACK.
WILLIAM MATISEK.